United States Patent

[11] 3,575,405

| [72] | Inventor | Emmit B. Harding |
| | | 41 West 112th St., New York, N.Y. 10026 |
| [21] | Appl. No. | 755,855 |
| [22] | Filed | Aug. 28, 1968 |
| [45] | Patented | Apr. 20, 1971 |

[54] PARALLEL BAR CLAMPING DEVICE
3 Claims, 8 Drawing Figs.

[52] U.S. Cl. ............................................ 269/258,
269/270, 269/279
[51] Int. Cl. ............................................ B25b 5/04,
B25b 5/16
[50] Field of Search............................................ 269/215,
257, 258, 264, 268, 270, 259, 269, 279; 81/424

[56] References Cited
UNITED STATES PATENTS

| 760,411 | 5/1904 | Arnold ........................ | 269/270X |
| 1,543,419 | 6/1925 | Burns .......................... | 269/258X |
| 3,071,368 | 1/1963 | Harding....................... | 269/215 |
| 3,315,954 | 4/1967 | Mayer ......................... | 269/264X |

Primary Examiner—Lester M. Swingle
Attorney—Leonard W. Suroff

ABSTRACT: A clamping device includes a pair of jaw members, each being mounted on corresponding ends of a pair of parallel bars for pivoting and sliding motion relative to said bars.

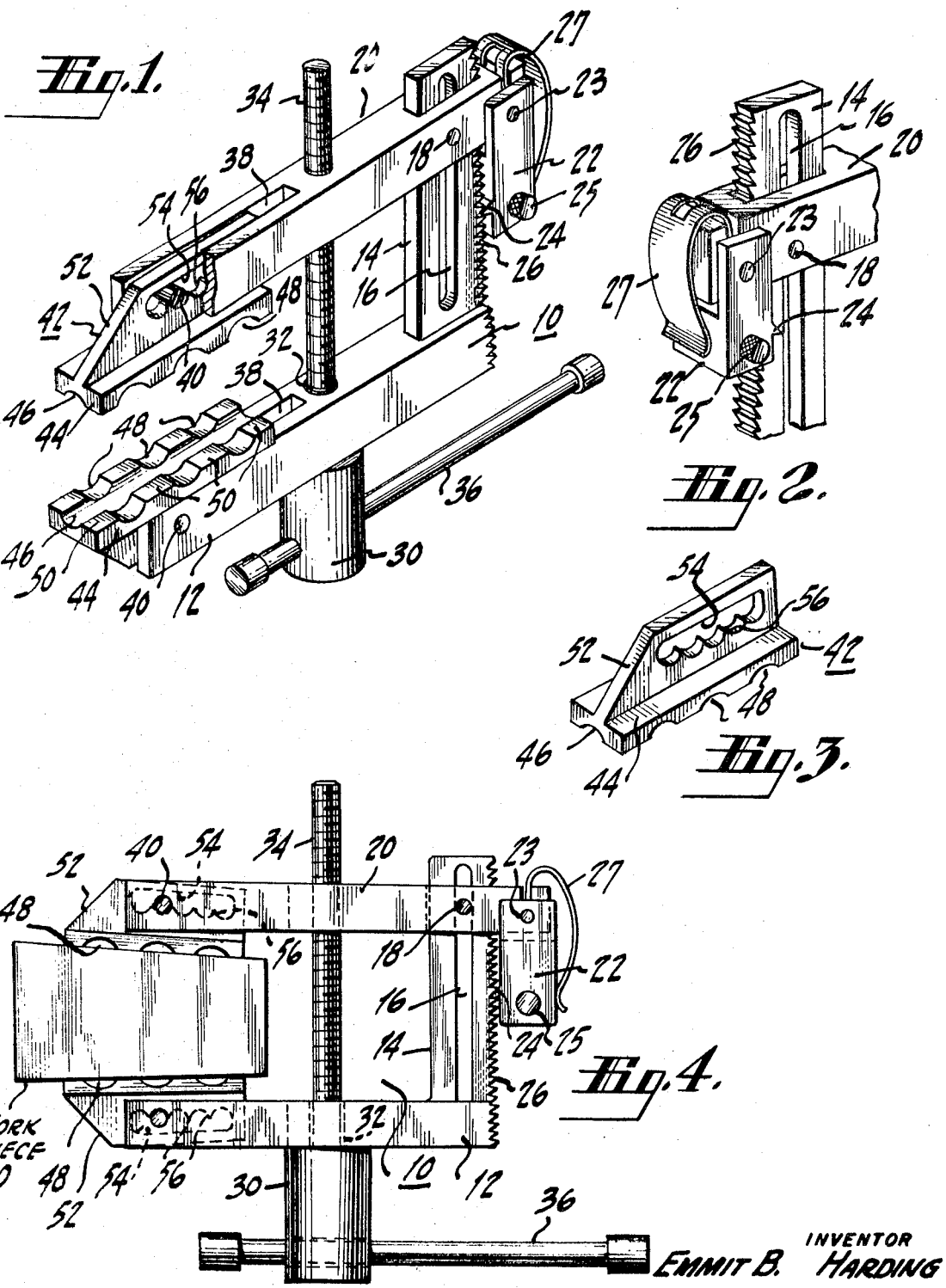
Patented April 20, 1971
3,575,405
2 Sheets-Sheet 1
INVENTOR
EMMIT B. HARDING
BY Leonard W. Suroff
ATTORNEY Patented April 20, 1971
3,575,405

INVENTOR
EMMIT B. HARDING

BY Leonard W. Suroff
ATTORNEY

PARALLEL BAR CLAMPING DEVICE

BACKGROUND OF THE INVENTION

This invention relates to clamping devices, and more particularly to a screw threaded clamping device of the type shown and described in my U.S. Pat. No. 3,071,368 for Steplock Rocker Jaw Parallel Clamp, issued Jan. 1, 1963.

OBJECTIVES OF THE INVENTION

It is an object of the present invention to provide an improved screw threaded parallel bar clamping device which includes a workpiece engaging jaw member having two degrees of freedom.

Another object of the present invention is to provide a clamping device capable of retaining in locked position a workpiece having flat or contoured configurations.

Another object of the present invention is to provide a clamping device capable of retaining a plurality of dowels simultaneously in a fixed position.

Another object of the present invention is to provide a clamping device in which the jaws are independently adjustable to retain a workpiece in position having different contoured surfaces.

Other objects of the present invention will be obvious as the description proceeds.

SUMMARY OF THE INVENTION

Briefly described, the clamping device of the invention includes a jaw member having a workpiece engaging plate portion and a web portion having an elongated slot therein receiving a cross pin mounting said jaw member on one of a pair of generally parallel bar members for pivotal and sliding motion.

As a feature of the invention and to increase the gripping effectiveness and maneuverability of the jaw member when handling small workpieces, the jaw member is provided with a plurality of channeled areas crisscrossing the workpiece engaging surface of the plate portion.

DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, in which:

FIG. 1, is a perspective view of a rocker jaw parallel clamp device constructed in accordance with the present invention;

FIG. 2, is an enlarged fragmentary perspective view of the ratchet mechanism of the clamp device;

FIG. 3, is a perspective view of one of the jaw members of the clamp device;

FIG. 4, is a side elevational view of the clamp device; and

DETAILED DESCRIPTION OF THE INVENTION

Figure 5:
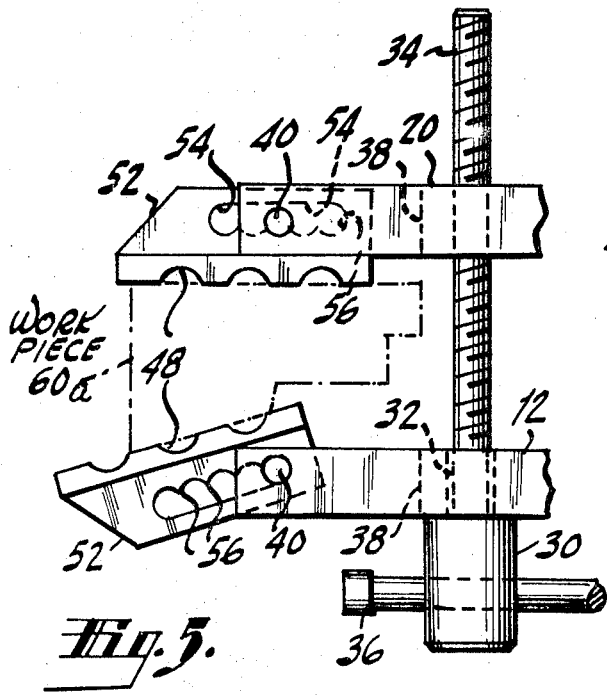
FIG. 5, 6, 7 and 8, are views illustrating the jaw members of the clamp device in operative engagement with various workpiece configurations.

Referring now to the drawings wherein like reference numerals will be used to designate like parts in the various FIGS., a clamp device is shown to include a base bar 12 having an upstanding column 14 at one end with a longitudinal slot 16 that slidably receives a cross pin 18 of a reaction bar 20. The adjacent end of the reaction bar 20 is provided with a ratchet lever 22 that pivotally is secured thereupon by means of a cross shaft 23. The opposite end of the ratched lever 22 is provided with a pawl 24 which releasably engages with a plurality of ratchet teeth 26 extending along the outermost edge of the upstanding column 14. A knurled knob 25 on the ratchet lever 22 serves to provide means for selectively pivoting said ratchet lever during the operation of the device.

A leaf type spring plate 27 is secured at one end to the reaction bar 20 and acts at its opposite end against the ratchet lever 22 to yieldingly maintain the pawl 24 in locking engagement with the teeth 26, such spring 27 being overcome by an outward pull upon the knob 25, thereby to release the pawl 24 from the teeth 26 for movement of the reaction bar 20 relative to the base bar 12. An operating shaft 30 is rotatably supported within a bearing 32 on the base bar 12 and has a threaded section 34 that is threadedly engaged with a central portion of the reaction bar 20. The opposite end of the shaft 30 is provided with an operating handle 36 for effecting rotation thereof.

In accordance with the present invention, the opposite free end of the base and reaction bars 12, 20 each includes a slot 38 and pin 40 extending crosswise thereof to receive and mount a jaw member 42 for pivotal and sliding movement relative to said bar ends. As best seen in FIGS. 1 and 3, each jaw member 42 includes a plate portion 44 having a main channel or recessed area 46 extending longitudinally along one side and a plurality of smaller channels 48 extending crosswise thereof so as to define a plurality of raised land area surfaces 50 therebetween. The channels are shown as being circular in the FIGS. so as to accommodate curved side portions of a workpiece to be clamped therebetween. Extending outwardly from the opposite side of said plate portion 44 and perpendicular thereto is a web portion 52 provided with a longitudinally elongated slot 54 having a scalloped or detented wall surface as shown at 56. The web portion 52 of the jaw member 42 is received within the bar end slot 38 such that the cross pin 40 extends through said elongated slot 54 and seats in one of the detents disposed along the interior wall surface 56. Sliding movement of the jaw member 42 is thus afforded along the length of the slot, while pivotal movement of the jaw is about the cross pin 40.

In actual use, the position of the ratchet end of the reaction bar 20 relative to the column end of the base bar 12 is initially adjusted by means of the ratchet lever 22 and cooperating pawl 24 and teeth 26 so as to conform generally to the thickness of an object or workpiece to be clamped. With the column 14 thus maintaining the base and reaction bars 12, 20 in substantially a common plane, the workpiece 60 may be placed between the plate portions of the jaw members 42, and the jaw members then each independently pivoted about their respective cross pins 40 and/or moved slidably forward or backward lengthwise along the respective bars 12, 20, so as to bring the plate portions 44 into the most favorable position for engaging opposite or selected surfaces of the workpiece. The sliding motion of the jaw member 42 is limited by the engagement of the cross pin 40 with the end walls of the web portion elongated slot 54. The two degrees of freedom afforded by the pivot and slide mounting of the jaw member 42 together with the channeled surface of the plate portion enhance the effectiveness and versatility of the clamp device by permitting the jaws to be maneuvered into a wide variety of angular positions, thereby to accommodate relatively different sized and shaped workpieces. With the jaw members oriented toward the selected sides of the workpiece 60, the handle is rotated to bring the jaw plate portions 44 into clamping engagement with the workpiece 60.

Figure 6:
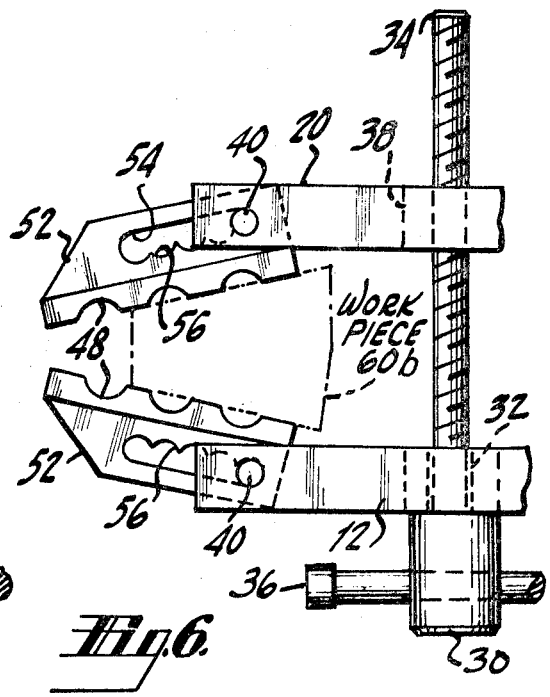
Figure 7:
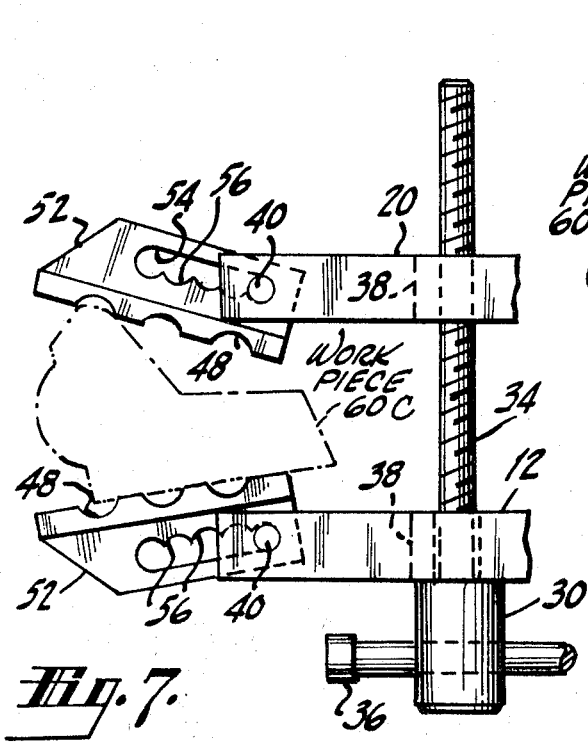
Figure 8:
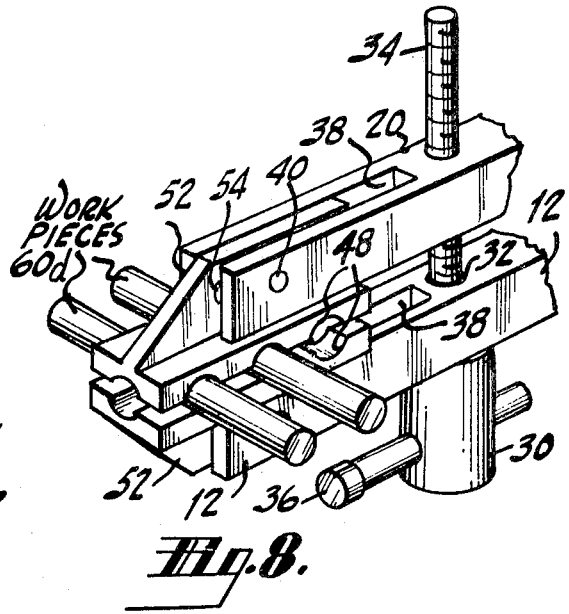

The versatility of the clamp device to accommodate various sized and shaped workpieces is particularly illustrated in FIGS. 5, 6 and 7, wherein the jaw members are shown in various angular positions as required to accommodate the different workpieces indicated respectively as 60a, 60b, and 60c, and in FIG. 8 wherein the jaw members are in clamped engagement with a pair of dowel shaped workpieces 60d seated in the smaller channels 48 of the respective plate portions.

FIG. 5, shows that web portions 52 are longitudinally adjusted to different extended lengths and angular positions such that one remains parallel and the other at an angle thereto to maintain the workpiece 60a in a fixed position.

FIG. 6, shows that the workpiece 60b has opposing inclined surfaces that are engaged by the respective web portion 52 and are inclined towards each other.

FIG. 7, further shows the versatility of the invention in that a workpiece 60c having opposing flat and curved surfaces may be retained in position by the flat surface of web portion 52 and channel 48 of the other web portion 52.

FIG. 8, shows that a plurality of dowel workpieces 60d may be retained in the channels 48 of the web portions 52.

The above disclosure has been given by way of illustration and elucidation, and not by way of limitation, and it is desired to protect all embodiments of the herein disclosed inventive concept within the scope of the appended claims.

I claim:

1. In a screw threaded clamping device of the type including a pair of spaced apart generally parallel bar members adapted to receive a workpiece in clamped retention between a pair of corresponding ends thereof, the improvement comprising:

first and second jaw members each including a workpiece engaging plate portion and a web portion having an elongated slot therein, the plate portions of said first and second members each being provided with a plurality of recessed areas on their opposing surfaces and defining relatively raised land areas therebetween so as to facilitate the clamped retention of a workpiece received therebetween, means including a pair of cross pins each separately receivable through a different one of said slots and mounting said jaw members on respectively corresponding ends of said bar members for pivoting and sliding motion relative thereto, and the interior wall surface of each of said elongated slots being provided with a plurality of detents serving as seating positions for said received cross pin to facilitate pivotal movement of said jaw members.

2. A clamping device as defined in claim 1, wherein in each of said jaw members, said detents are disposed along the slot engaging surface closest to said workpiece engaging plate portion.

3. A clamping device as defined in claim 1, wherein said pivotal and sliding motion of one of said jaw members is independent of the pivotal and sliding motion of the other of said jaw members so as to permit said jaw members to conform generally to selected surfaces of the workpiece to be clamped therebetween.